(12) United States Patent
Hargudkar et al.

(10) Patent No.: US 12,346,344 B2
(45) Date of Patent: Jul. 1, 2025

(54) METHOD AND SYSTEM FOR MANAGING CROSS-ACCOUNT DATA DISTRIBUTION

(71) Applicant: JPMorgan Chase Bank, N.A., New York, NY (US)

(72) Inventors: Dilip Hargudkar, Plano, TX (US); Bao Nguyen, Plano, TX (US); Nirmalkumar Elumalai, Plano, TX (US); Lekha Shree Sampath, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/239,502

(22) Filed: Aug. 29, 2023

(65) Prior Publication Data

US 2025/0077544 A1   Mar. 6, 2025

(51) Int. Cl.
   *G06F 16/20* (2019.01)
   *G06F 16/27* (2019.01)
(52) U.S. Cl.
   CPC ................... *G06F 16/27* (2019.01)
(58) Field of Classification Search
   CPC .................................................. G06F 16/27
   See application file for complete search history.

(56) References Cited

U.S. PATENT DOCUMENTS

| | | | |
|---|---|---|---|
| 12,072,904 B1* | 8/2024 | Averbuch | G06F 16/254 |
| 2021/0208948 A1* | 7/2021 | Sagi | G06Q 30/0609 |
| 2021/0232603 A1* | 7/2021 | Sundaram | G06F 16/2358 |
| 2023/0244505 A1* | 8/2023 | Hernandez Serrano | H04L 43/06 715/744 |

* cited by examiner

Primary Examiner — Kristopher Andersen
(74) Attorney, Agent, or Firm — Greenblum & Bernstein, P.L.C.

(57) ABSTRACT

A method for providing cross-account data distribution management is disclosed. The method includes receiving an indication of a change in an object repository of a producer account, the change including an addition of data sets into the object repository; scheduling computing resources based on the indication and a predetermined guideline; identifying, via an application programming interface, parameters that correspond to a data warehouse of a consumer account; initiating the computing resources based on the scheduling to copy the data sets from the object repository to a producer data lake; transmitting, based on the identified parameters, the data sets from the producer data lake to a consumer data lake by using a managed data lake; and persisting the data sets from the consumer data lake in the data warehouse.

18 Claims, 5 Drawing Sheets

METHOD AND SYSTEM FOR MANAGING CROSS-ACCOUNT DATA DISTRIBUTION

BACKGROUND

1. Field of the Disclosure

This technology generally relates to methods and systems for managing data distributions, and more particularly to methods and systems for providing cross-account data distribution management to facilitate data hydration without data source duplication.

2. Background Information

Many business entities implement large networks of applications in various computing environments such as, for example, cloud computing environments to enable business operations and provide services for users. Often, the applications use a data mesh architecture to provide a federated approach for data producers and data consumers. Historically, implementations of conventional data distribution techniques have resulted in varying degrees of success with respect to facilitating cross-account data hydration without duplicating data sources.

One drawback of using the conventional data distribution techniques is that in many instances, data must be duplicated into different accounts of object storage before the data can be loaded into data warehouses for business analysis and/or consumption by consumer applications. As a result, computing resources must be expended to remove the duplicate data to complete the data distribution process. Additionally, due to the resources required for the removal of the duplicate data, data distribution performance may not be adequate for certain workloads that require enhanced querying performance.

Therefore, there is a need to provide cross-account data distribution management that leverages a unique, computing environment agnostic design to facilitate data hydration without data source duplication.

SUMMARY

The present disclosure, through one or more of its various aspects, embodiments, and/or specific features or sub-components, provides, inter alia, various systems, servers, devices, methods, media, programs, and platforms for providing cross-account data distribution management to facilitate data hydration without data source duplication.

According to an aspect of the present disclosure, a method for providing cross-account data distribution management is disclosed. The method is implemented by at least one processor. The method may include receiving an indication of a change in an object repository of a producer account, the change may include an addition of at least one data set into the object repository; scheduling at least one computing resource based on the indication and a predetermined guideline; identifying, via an application programming interface, at least one parameter that corresponds to a data warehouse of a consumer account; initiating the at least one computing resource based on the scheduling to copy the at least one data set from the object repository to a producer data lake; transmitting, based on the identified at least one parameter, the at least one data set from the producer data lake to a consumer data lake by using a managed data lake; and persisting the at least one data set from the consumer data lake in the data warehouse.

In accordance with an exemplary embodiment, each of the producer account and the consumer account may be linked via a cross-account role that enables access between a plurality of accounts, the access may include automatic authentication based on the cross-account role.

In accordance with an exemplary embodiment, each of the producer account and the consumer account may correspond to a resource container that delineates a plurality of computing resources in a cloud computing environment, the plurality of computing resources may include at least one from among a storage bucket, a relational database, and a compute instance.

In accordance with an exemplary embodiment, the producer account may include a first set of computing resources in a first cloud computing environment and the consumer account may include a second set of computing resources in a second cloud computing environment that is different from the first cloud computing environment.

In accordance with an exemplary embodiment, the indication may be dynamically triggered based on satisfaction of at least one predetermined criterion, the at least one predetermined criterion may include at least one from among a saved data criterion and a data type criterion.

In accordance with an exemplary embodiment, to schedule the at least one computing resource, the method may further include assigning, via a scheduler service, at least one task to each of the at least one computing resource based on a load balancing requirement, wherein network traffic that corresponds to the at least one task may be equally distributed across each of the at least one computing resource based on the load balancing requirement.

In accordance with an exemplary embodiment, each of the at least one data set may be transformed into a structured data set based on the identified at least one parameter prior to transmission to the consumer data lake, the structured data set may include at least one from among a dynamically generated table and a data grant that defines permissions for accessing the structured data set.

In accordance with an exemplary embodiment, the managed data lake may be configured to transfer the at least one data set from the producer data lake to the consumer data lake without duplicating the at least one data set in a storage layer.

According to an aspect of the present disclosure, a computing device configured to implement an execution of a method for providing cross-account data distribution management is disclosed. The computing device including a processor; a memory; and a communication interface coupled to each of the processor and the memory, wherein the processor may be configured to receive an indication of a change in an object repository of a producer account, the change may include an addition of at least one data set into the object repository; schedule at least one computing resource based on the indication and a predetermined guideline; identify, via an application programming interface, at least one parameter that corresponds to a data warehouse of a consumer account; initiate the at least one computing resource based on the scheduling to copy the at least one data set from the object repository to a producer data lake; transmit, based on the identified at least one parameter, the at least one data set from the producer data lake to a consumer data lake by using a managed data lake; and persist the at least one data set from the consumer data lake in the data warehouse.

In accordance with an exemplary embodiment, the processor may be further configured to link each of the producer account and the consumer account via a cross-account role that enables access between a plurality of accounts, the access may include automatic authentication based on the cross-account role.

In accordance with an exemplary embodiment, each of the producer account and the consumer account may correspond to a resource container that delineates a plurality of computing resources in a cloud computing environment, the plurality of computing resources may include at least one from among a storage bucket, a relational database, and a compute instance.

In accordance with an exemplary embodiment, the producer account may include a first set of computing resources in a first cloud computing environment and the consumer account may include a second set of computing resources in a second cloud computing environment that is different from the first cloud computing environment.

In accordance with an exemplary embodiment, the processor may be further configured to dynamically trigger the indication based on satisfaction of at least one predetermined criterion, the at least one predetermined criterion may include at least one from among a saved data criterion and a data type criterion.

In accordance with an exemplary embodiment, to schedule the at least one computing resource, the processor may be further configured to assign, via a scheduler service, at least one task to each of the at least one computing resource based on a load balancing requirement, wherein network traffic that corresponds to the at least one task may be equally distributed across each of the at least one computing resource based on the load balancing requirement.

In accordance with an exemplary embodiment, the processor may be further configured to transform each of the at least one data set into a structured data set based on the identified at least one parameter prior to transmission to the consumer data lake, the structured data set may include at least one from among a dynamically generated table and a data grant that defines permissions for accessing the structured data set.

In accordance with an exemplary embodiment, the processor may be further configured to configure the managed data lake to transfer the at least one data set from the producer data lake to the consumer data lake without duplicating the at least one data set in a storage layer.

According to an aspect of the present disclosure, a non-transitory computer readable storage medium storing instructions for providing cross-account data distribution management is disclosed. The storage medium including executable code which, when executed by a processor, may cause the processor to receive an indication of a change in an object repository of a producer account, the change may include an addition of at least one data set into the object repository; schedule at least one computing resource based on the indication and a predetermined guideline; identify, via an application programming interface, at least one parameter that corresponds to a data warehouse of a consumer account; initiate the at least one computing resource based on the scheduling to copy the at least one data set from the object repository to a producer data lake; transmit, based on the identified at least one parameter, the at least one data set from the producer data lake to a consumer data lake by using a managed data lake; and persist the at least one data set from the consumer data lake in the data warehouse.

In accordance with an exemplary embodiment, when executed by the processor, the executable code may further cause the processor to link each of the producer account and the consumer account via a cross-account role that enables access between a plurality of accounts, the access may include automatic authentication based on the cross-account role.

In accordance with an exemplary embodiment, each of the producer account and the consumer account may correspond to a resource container that delineates a plurality of computing resources in a cloud computing environment, the plurality of computing resources may include at least one from among a storage bucket, a relational database, and a compute instance.

In accordance with an exemplary embodiment, the producer account may include a first set of computing resources in a first cloud computing environment and the consumer account may include a second set of computing resources in a second cloud computing environment that is different from the first cloud computing environment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
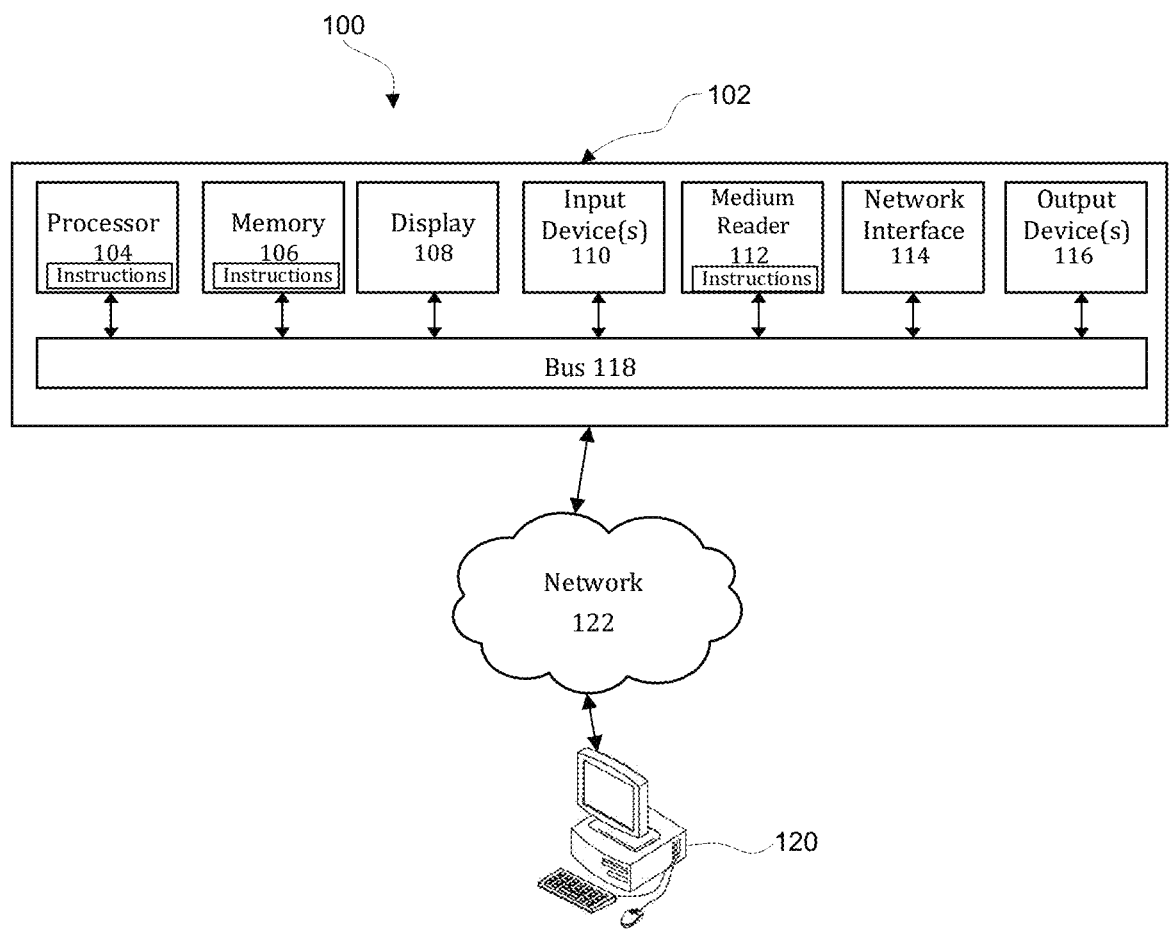
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing cross-account data distribution management to facilitate data hydration without data source duplication.

Figure 2:
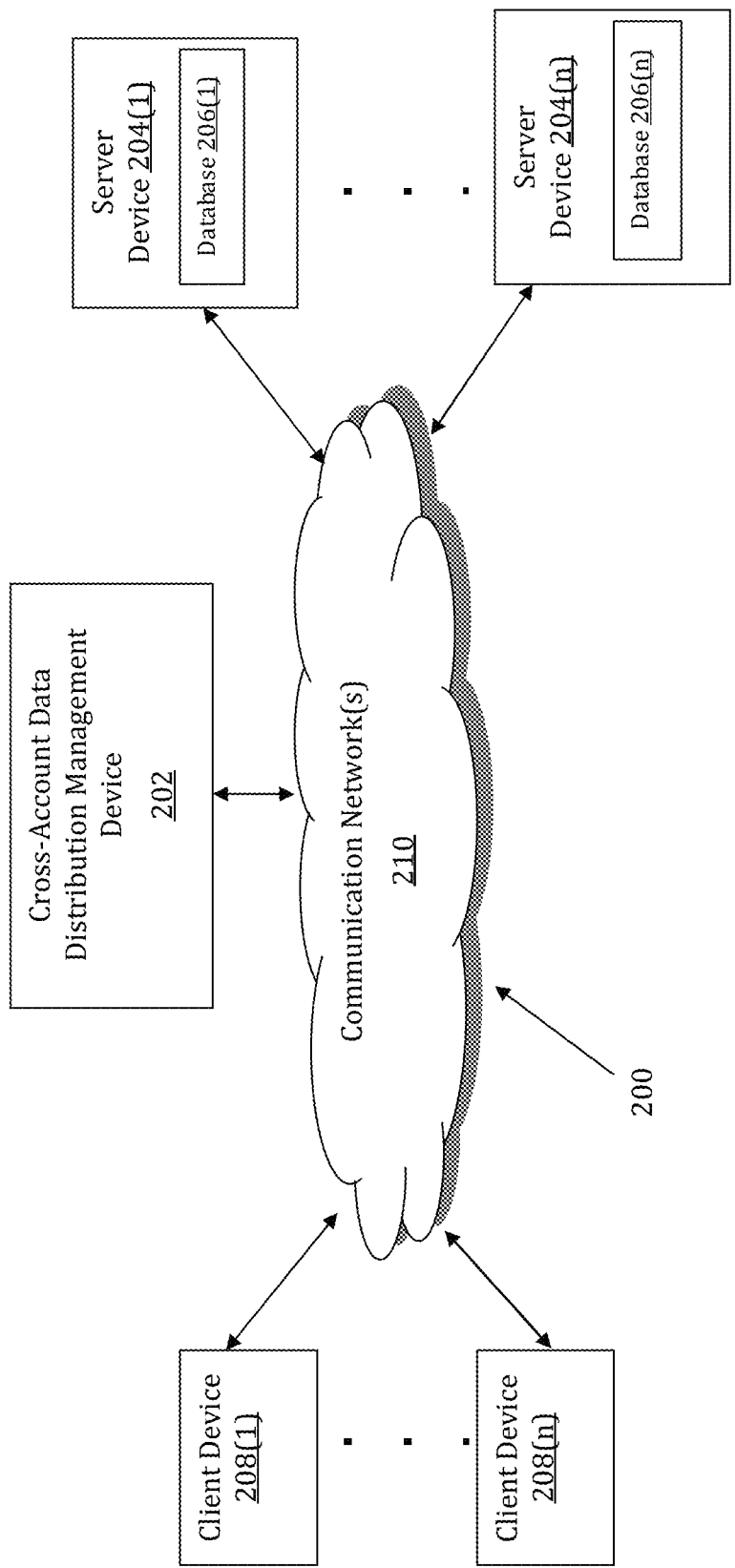
FIG. 2 illustrates an exemplary diagram of a network environment.

Referring to FIG. 2, a schematic of an exemplary network environment 200 for implementing a method for providing cross-account data distribution management to facilitate data hydration without data source duplication is illustrated. In an exemplary embodiment, the method is executable on any networked computer platform, such as, for example, a personal computer (PC).

The method for providing cross-account data distribution management to facilitate data hydration without data source duplication may be implemented by a Cross-Account Data Distribution Management (CADDM) device 202. The CADDM device 202 may be the same or similar to the computer system 102 as described with respect to FIG. 1. The CADDM device 202 may store one or more applications that can include executable instructions that, when executed by the CADDM device 202, cause the CADDM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CADDM device 202 itself, may be located in virtual server(s) running in a cloud-based computing environment rather than being tied to one or more specific physical network computing devices. Also, the application(s) may be running in one or more virtual machines (VMs) executing on the CADDM device 202. Additionally, in one or more embodiments of this technology, virtual machine(s) running on the CADDM device 202 may be managed or supervised by a hypervisor.

In the network environment 200 of FIG. 2, the CADDM device 202 is coupled to a plurality of server devices 204(1)-204(n) that hosts a plurality of databases 206(1)-206(n), and also to a plurality of client devices 208(1)-208(n) via communication network(s) 210. A communication interface of the CADDM device 202, such as the network interface 114 of the computer system 102 of FIG. 1, operatively couples and communicates between the CADDM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CADDM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CADDM devices that efficiently implement a method for providing cross-account data distribution management to facilitate data hydration without data source duplication.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CADDM device 202 may be a standalone device or integrated with one or more other devices or apparatuses, such as one or more of the server devices 204(1)-204(n), for example. In one particular example, the CADDM device 202 may include or be hosted by one of the server devices 204(1)-204(n), and other arrangements are also possible. Moreover, one or more of the devices of the CADDM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CADDM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to indications, data sets, computing resources, predetermined guidelines, parameters, data lakes, producer accounts, consumer accounts, and data warehouses.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CADDM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CADDM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CADDM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CADDM device 202, the server devices 204(1)-204(n), or the client devices 208(1)-208(n), for example, may be configured to operate as virtual instances on the same physical machine. In other words, one or more of the CADDM device 202, the server devices 204(1)-204(n), or the client devices 208(1)-208(n) may operate on the same physical device rather than as separate devices communicating through communication network(s) 210. Additionally, there may be more or fewer CADDM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
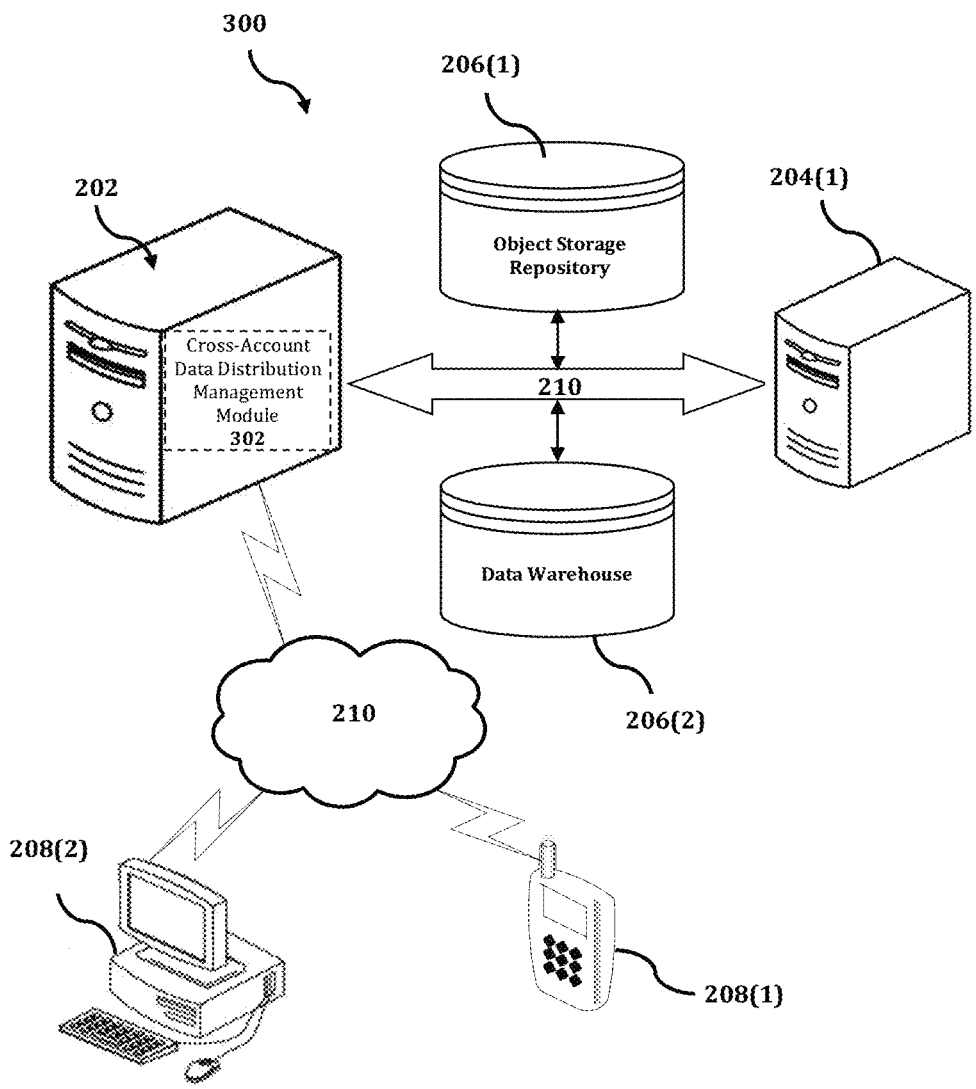
FIG. 3 shows an exemplary system for implementing a method for providing cross-account data distribution management to facilitate data hydration without data source duplication.

The CADDM device 202 is described and shown in FIG. 3 as including a cross-account data distribution management module 302, although it may include other rules, policies, modules, databases, or applications, for example. As will be described below, the cross-account data distribution management module 302 is configured to implement a method for providing cross-account data distribution management to facilitate data hydration without data source duplication.

An exemplary process 300 for implementing a mechanism for providing cross-account data distribution management to facilitate data hydration without data source duplication by utilizing the network environment of FIG. 2 is shown as being executed in FIG. 3. Specifically, a first client device 208(1) and a second client device 208(2) are illustrated as being in communication with CADDM device 202. In this regard, the first client device 208(1) and the second client device 208(2) may be "clients" of the CADDM device 202 and are described herein as such. Nevertheless, it is to be known and understood that the first client device 208(1) and/or the second client device 208(2) need not necessarily be "clients" of the CADDM device 202, or any entity described in association therewith herein. Any additional or alternative relationship may exist between either or both of the first client device 208(1) and the second client device 208(2) and the CADDM device 202, or no relationship may exist.

Further, CADDM device 202 is illustrated as being able to access an object storage repository 206(1) and a data warehouse 206(2). The cross-account data distribution management module 302 may be configured to access these databases for implementing a method for providing cross-account data distribution management to facilitate data hydration without data source duplication.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CADDM device 202 via broadband or cellular communication. Of course, these embodiments are merely exemplary and are not limiting or exhaustive.

Upon being started, the cross-account data distribution management module 302 executes a process for providing cross-account data distribution management to facilitate data hydration without data source duplication. An exemplary process for providing cross-account data distribution management to facilitate data hydration without data source duplication is generally indicated at flowchart 400 in FIG. 4.

Figure 4:
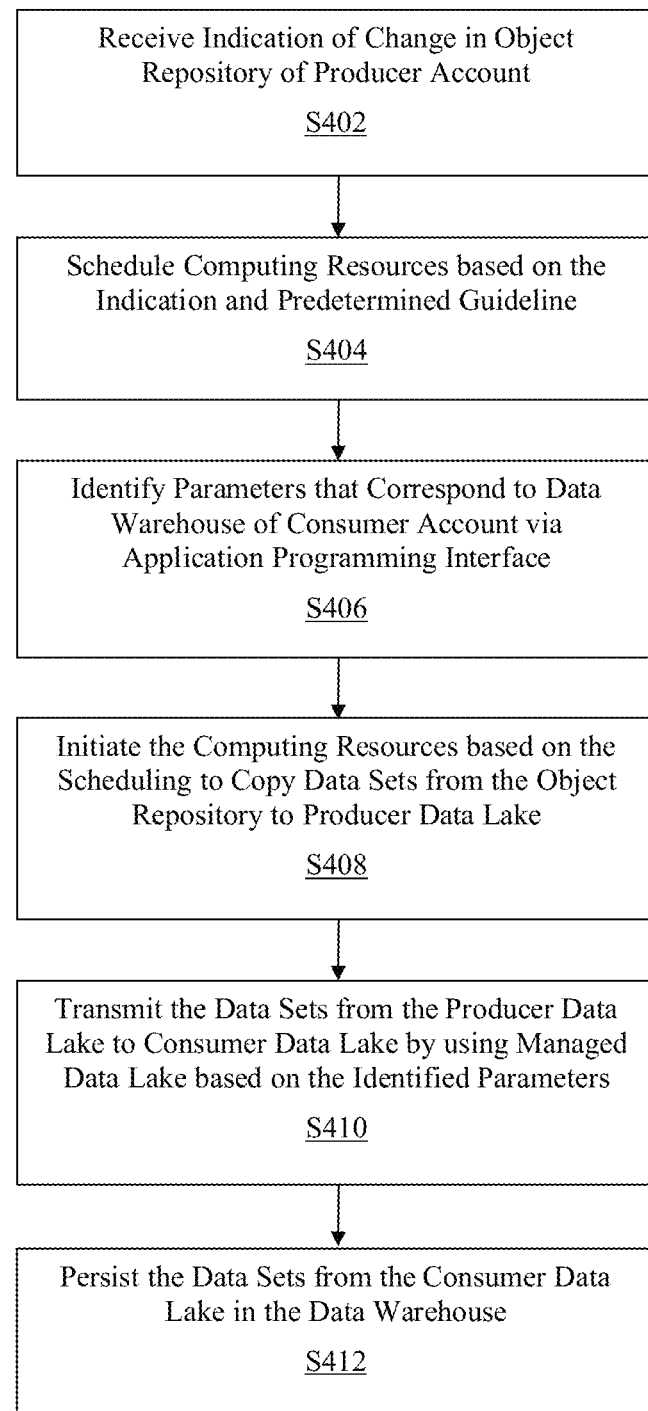
FIG. 4 is a flowchart of an exemplary process for implementing a method for providing cross-account data distribution management to facilitate data hydration without data source duplication.

In the process 400 of FIG. 4, at step S402, an indication of a change in an object storage repository may be received. In an exemplary embodiment, the indication may relate to an event message that provides information relating to the change. The indication may be received from a data management component such as, for example, an on-premises application that provides data to the object storage repository. The application may communicate with a compute instance such as, for example, a serverless compute instance of a producer account to provide the indication.

In another exemplary embodiment, the change may include an addition of data sets into the object storage repository. For example, the change may occur in the object storage repository when new data is added by the data management component. Similarly, the change may relate to the updating of existing data in the object storage repository. For example, the change may occur in the object storage repository when customer information is updated by the data management component. Alternatively, the change may also include the removal of data sets from the object storage repository. The removal of the data sets from the object storage repository may represent a change in the data that is stored in the object storage repository.

In another exemplary embodiment, the object storage repository may be associated with a producer account. The object storage repository may relate to a centralized data storage component that persists data. Object storage may correspond to a data storage architecture that is usable for storing various data types such as, for example, unstructured data. The object storage repository may section data into units such as, for example, objects, which are stored in a structurally flat data environment. Each of the objects may include the data, corresponding metadata, as well as a unique identifier that is usable by applications to access and retrieve the objects.

In another exemplary embodiment, the object storage repository may be located within any computing environment that facilitates the processing and management of data. For example, the object storage repository may relate to a service that is associated with a producer account in a cloud computing environment. Alternatively, the object storage repository may relate to an application that facilitates the processing and management of data in an on-premises computing environment. Consistent with present disclosures, the object storage repository may be located in any combination of computing environments as a single database and/or as a distributed database.

In another exemplary embodiment, the indication may be dynamically triggered based on satisfaction of predetermined criteria. The predetermined criteria may include at least one from among a saved data criterion and a data type criterion. The saved data criterion may provide for the triggering of the indication when any data is saved in the object storage repository.

Likewise, the data type criterion may provide for the triggering of the indication when a certain data type is detected in the object storage repository. The data type criterion may define data formats to facilitate the detection. For example, the data type criterion may provide that detection of image data in the object storage repository triggers the indication. Alternatively, the data type criterion may define contextual data that facilitates the detection. For example, the data type criterion may provide that detection of policy update documents in the object storage repository triggers the indication.

In another exemplary embodiment, the applications described in the present disclosure may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, computing resources may be scheduled based on the indication and a predetermined guideline. The computing resources may be scheduled according to the predetermined guideline when the indication provides that a change has occurred in the object storage repository.

In an exemplary embodiment, resource scheduling in a computing environment such as, for example, a cloud computing environment may relate to actions that facilitate a process by assigning computing resources to perform corresponding tasks. The computing resources may include at least one from among a storage bucket, a relational database, and a compute instance. Likewise, the tasks may relate to threads, processes, and/or data flows. Consistent with present disclosures, the scheduling activities may be performed by a computing service such as, for example, a scheduler service.

In another exemplary embodiment, to facilitate the scheduling of the computing resources, tasks may be assigned to each of the computing resources via a scheduler service. The tasks may be automatically assigned to each of the computing resources based on a load balancing requirement. The load balancing requirement may indicate that network traffic corresponding to the tasks must be equally distributed across each of the computing resources. The scheduler service may utilize the load balancing requirement to ensure that the computing resources are operating at efficient levels.

In another exemplary embodiment, the predetermined guideline may define desired preferences for the scheduling of the computing resources. The predetermined guideline may relate to at least one from among an operational guideline, a business guideline, and a regulatory guideline. The operational guideline may reflect preferences related to the functioning of the computing environment. For example, the operational guideline may provide a latency threshold for each of the computing resources to ensure optimal performance.

Likewise, the business guideline may reflect preferences related to commercial aspects of the computing environment. For example, the operational guideline may provide that the computing resources are initiated during off peak periods to reduce costs. Furthermore, the regulatory guideline may reflect requirements that are imposed on the computing environment. For example, the regulatory guideline may provide that certain types of data are only processed by certain computing resources.

At step S406, parameters that correspond to a data warehouse may be identified via an application programming interface. The data warehouse may be associated with a consumer account. In an exemplary embodiment, an interface such as, for example, the application programming interface of the data warehouse may be triggered to retrieve the parameters. Consistent with present disclosures, the application programming interface may be triggered by a serverless compute instance of the producer account to retrieve the parameters from the data warehouse.

In another exemplary embodiment, the parameters may relate to data requirements of the data warehouse. The parameters may define data structures that are accepted by the data warehouse. For example, the parameters may define a tabular data structure that is required by the data warehouse. The parameters may include a set of definitions and protocols that facilitate communication with the data warehouse.

In another exemplary embodiment, the data warehouse may correspond to an enterprise system that is usable for the analysis and reporting of structured as well as semi-structured data. The data warehouse may be usable for analysis and/or custom reporting. The data warehouse may relate to a repository that persists integrated data from a variety of sources. For example, the data warehouse may store current and historical data that are usable for creating analytical reports for users.

In another exemplary embodiment, each of the producer account and the consumer account may be linked via a cross-account role that enables access between various accounts. The cross-account role may be usable to delegate access to resources in different accounts of a computing environment such as, for example, a cloud computing environment. The access may include automatic authentication based on the cross-account role. Alternatively, the cross-account role may be usable to enable access between linked producer accounts and consumer accounts without requiring reauthentication. By reducing the amount of reauthentication between the producer accounts and the consumer accounts, querying performance may be improved.

In another exemplary embodiment, each of the producer account and the consumer account may correspond to a resource container that delineates various computing resources in a cloud computing environment. The computing resources may include at least one from among a storage bucket, a relational database, and a compute instance. Each of the computing resources may be uniquely identified by using a resource name that includes an account identifier of the account that contains and/or owns the resource.

In another exemplary embodiment, the producer account may include a first set of computing resources in a first cloud computing environment and the consumer account may include a second set of computing resources in a second cloud computing environment that is different from the first cloud computing environment. That is, the disclosed solution is computing environment agnostic and able to process data across different computing environments as well as across different platforms. For example, the producer account on a cloud computing environment may facilitate data hydration for the consumer account on a different cloud computing environment.

At step S408, the computing resources may be initiated based on the scheduling to copy the data sets from the object repository to a producer data lake. In an exemplary embodiment, the data sets may be copied to the producer data lake to facilitate the structuring of the data sets for the consumer account. The producer data lake may relate to a repository that is designed to store, process, and secure large amounts of structured, semi-structured, and unstructured data. The producer data lake may store data in a native format for subsequent processing.

At step S410, the data sets may be transmitted from the producer data lake to a consumer data lake by using a managed data lake. The data sets may be transmitted based on the identified parameters. In an exemplary embodiment, the consumer data lake may serve to store the data sets for the consumer account to facilitate the structuring of the data sets for the data warehouse. The consumer data lake may relate to a repository that is designed to store, process, and secure large amounts of structured, semi-structured, and unstructured data. The consumer data lake may store data in a native format for subsequent processing.

In another exemplary embodiment, the managed data lake may be configured to transfer the data sets from the producer data lake to the consumer data lake without duplicating the data sets in a storage layer. The managed data lake may relate to a repository that is designed to store, process, and secure large amounts of structured, semi-structured, and unstructured data. The managed data lake may store data in a native format for subsequent processing.

In another exemplary embodiment, each of the data sets may be transformed into a structured data set prior to transmission to the consumer data lake. The data sets may be automatically transformed into the structured data sets based on the identified parameters of the data warehouse. The structured data sets may include at least one from among a dynamically generated table and a data grant that defines permissions for accessing the structured data sets.

At step S412, the data sets may be persisted from the consumer data lake into the data warehouse. In an exemplary embodiment, a notification may be generated to provide a status of the persistence in the data warehouse. The notification may include information that relates to the persisting of the data sets, a condition of the data warehouse, and any errors that may have occurred during the persistence. In another exemplary embodiment, the notification may be transmitted to the producer account via the application programming interface of the data warehouse. The notification may provide that the data sets have been successfully persisted in the data warehouse to facilitate subsequent scheduling of other data sets.

Figure 5:
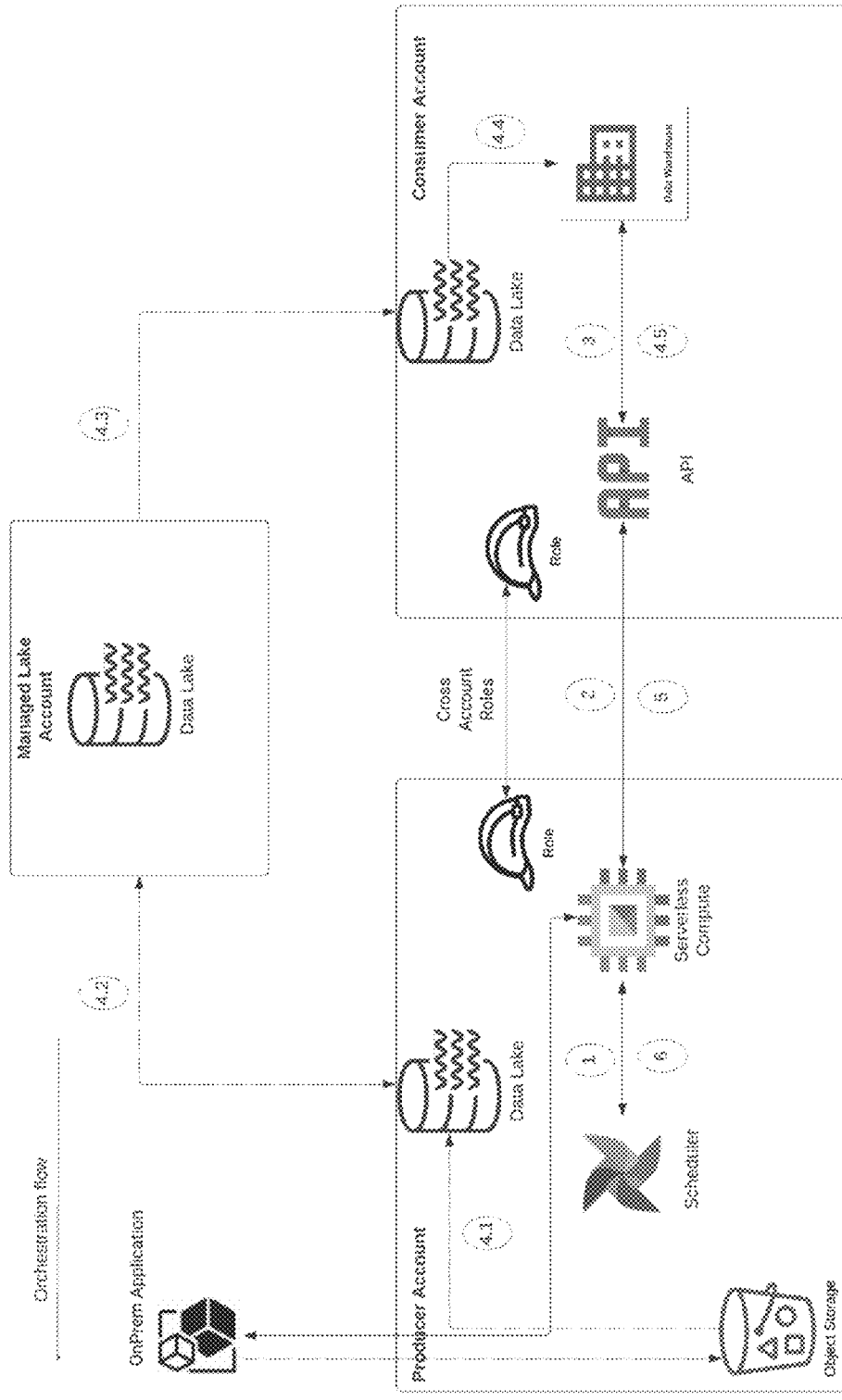
FIG. 5 is a flow diagram of an exemplary process for implementing a method for providing cross-account data distribution management to facilitate data hydration without data source duplication.

FIG. 5 is a flow diagram 500 of an exemplary process for implementing a method for providing cross-account data distribution management to facilitate data hydration without data source duplication. In FIG. 5, a cloud agnostic design pattern is provided to facilitate cross-account data migration from producer accounts to consumer accounts. The design pattern leverages trusted account-role pairs to migrate data across various computing environments without data source duplication.

As illustrated in FIG. 5, at step 1, a serverless compute instance may be triggered by an on-premises application, which requires communication with the scheduler service. The trigger may relate to the addition of new data to the object storage repository. At step 2, the serverless compute instance of a producer account may trigger an application programming interface that is associated with a data warehouse. At step 3, the serverless compute instance may retrieve necessary parameters of the data warehouse via the application programming interface.

Then, at step 4.1, the new data may be transmitted from the object storage repository to a producer data lake of the producer account. At step 4.2, the new data may be transmitted to a managed data lake that facilitates the cross-account data migration. Consistent with present disclosures, the managed data lake may preprocess the new data prior to transmitting to a consumer data lake of a consumer account in step 4.3. At step 4.4, additional processing of the new data may be performed by the consumer data lake prior to persistence in the data warehouse.

At step 4.5, the data warehouse may provide status information to the producer account via the application programming interface. The status information may include at least one from among a completed status and an incomplete status. The incomplete status may include details as to why the persistence was not completed as well as recommended resolution actions. At step 5, the producer account receives the status information via the serverless compute instance and updates the scheduler service accordingly at step 6.

Accordingly, with this technology, an optimized process for providing cross-account data distribution management to facilitate data hydration without data source duplication is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing cross-account data distribution management, the method being implemented by at least one processor, the method comprising:
   receiving, by the at least one processor, an indication of a change in an object repository of a producer account, the change including an addition of at least one data set into the object repository;
   assigning, by the at least one processor via a scheduler service, at least one computing resource to perform at least one task, based on the indication, a predetermined guideline, and an operation efficiency level for each of the least one computing resource;
   retrieving, by the at least one processor via an application programming interface, at least one parameter that corresponds to a data warehouse of a consumer account, wherein the application programming interface is triggered by a serverless compute instance of the producer account to perform the retrieving;
   initiating, by the at least one processor, the at least one computing resource, based on the assigning, to copy the at least one data set from the object repository to a producer data lake;
   transferring, by the at least one processor via a managed data lake and based on the retrieved at least one parameter, the at least one data set from the producer data lake to a consumer data lake without duplication of the at least one data set in a storage layer; and
   persisting, by the at least one processor, the at least one data set from the consumer data lake in the data warehouse,
   wherein each of the producer account and the consumer account is linked via a cross-account role that enables access between a plurality of accounts, and
   wherein the cross-account role is leveraged for the transferring of the at least one data set from the producer data lake to a consumer data lake without duplication of the at least one data set from the producer data lake.

2. The method of claim 1, wherein the access includes automatic authentication based on the cross-account role.

3. The method of claim 1, wherein each of the producer account and the consumer account corresponds to a resource container that delineates a plurality of computing resources in a cloud computing environment, the plurality of computing resources including at least one from among a storage bucket, a relational database, a compute instance, and wherein each respective computing resource of the plurality of computing resources is delineated by a corresponding respective resource name that includes an account identifier.

4. The method of claim 1, wherein the producer account includes a first set of computing resources in a first cloud computing environment and the consumer account includes a second set of computing resources in a second cloud computing environment that is different from the first cloud computing environment.

5. The method of claim 1, wherein the indication is dynamically triggered based on satisfaction of at least one predetermined criterion, the at least one predetermined criterion including at least one from among a saved data criterion and a data type criterion.

6. The method of claim 1, wherein the assigning of the at least one computing resource further comprises:
   assigning, by the at least one processor via the scheduler service, the at least one task to each of the at least one computing resource based on a load balancing requirement, wherein network traffic that corresponds to the at least one task is equally distributed across each of the at least one computing resource based on the load balancing requirement.

7. The method of claim 1, further comprising:
transforming, by the at least one processor, each of the at least one data set into a structured data set, based on the retrieved at least one parameter, prior to transmission to the consumer data lake, wherein the structured data set includes a data grant that defines permissions for accessing the structured data set.

8. A computing device configured to implement an execution of a method for providing cross-account data distribution management, the computing device comprising:
a processor;
a memory; and
a communication interface coupled to each of the processor and the memory,
wherein the processor is configured to:
receive an indication of a change in an object repository of a producer account, the change including an addition of at least one data set into the object repository;
assign, via a scheduler service, at least one computing resource to perform at least one task, based on the indication, a predetermined guideline, and an operation efficiency level for each of the least one computing resource;
retrieve, via an application programming interface, at least one parameter that corresponds to a data warehouse of a consumer account, wherein the application programming interface is triggered by a serverless compute instance of the producer account to perform the retrieving;
initiate the at least one computing resource, based on the assigning, to copy the at least one data set from the object repository to a producer data lake;
transfer, via a managed data lake and based on the retrieved at least one parameter, the at least one data set from the producer data lake to a consumer data lake without duplication of the at least one data set in a storage layer; and
persist the at least one data set from the consumer data lake in the data warehouse,
wherein each of the producer account and the consumer account is linked via a cross-account role that enables access between a plurality of accounts, and
wherein the cross-account role is leveraged for the transferring of the at least one data set from the producer data lake to a consumer data lake without duplication of the at least one data set from the producer data lake.

9. The computing device of claim 8, wherein the access includes automatic authentication based on the cross-account role.

10. The computing device of claim 8, wherein each of the producer account and the consumer account corresponds to a resource container that delineates a plurality of computing resources in a cloud computing environment, the plurality of computing resources including at least one from among a storage bucket, a relational database, and a compute instance, and wherein each respective computing resource of the plurality of computing resources is delineated by a corresponding respective resource name that includes an account identifier.

11. The computing device of claim 8, wherein the producer account includes a first set of computing resources in a first cloud computing environment and the consumer account includes a second set of computing resources in a second cloud computing environment that is different from the first cloud computing environment.

12. The computing device of claim 8, wherein the processor is further configured to dynamically trigger the indication based on satisfaction of at least one predetermined criterion, the at least one predetermined criterion including at least one from among a saved data criterion and a data type criterion.

13. The computing device of claim 8, wherein, to assign the at least one computing resource, the processor is further configured to:
assign, via the scheduler service, the at least one task to each of the at least one computing resource based on a load balancing requirement,
wherein network traffic that corresponds to the at least one task is equally distributed across each of the at least one computing resource based on the load balancing requirement.

14. The computing device of claim 8, wherein the processor is further configured to transform each of the at least one data set into a structured data set based on the retrieved at least one parameter prior to transmission to the consumer data lake, wherein the structured data set includes a data grant that defines permissions for accessing the structured data set.

15. A non-transitory computer readable storage medium storing instructions for providing cross-account data distribution management, the storage medium comprising executable code which, when executed by a processor, causes the processor to:
receive an indication of a change in an object repository of a producer account, the change including an addition of at least one data set into the object repository;
assign, via a scheduler service, at least one computing resource to perform at least one task, based on the indication, a predetermined guideline, and an operation efficiency level for each of the least one computing resource;
retrieve, via an application programming interface, at least one parameter that corresponds to a data warehouse of a consumer account, wherein the application programming interface is triggered by a serverless compute instance of the producer account to perform the retrieving;
initiate the at least one computing resource, based on the assigning, to copy the at least one data set from the object repository to a producer data lake;
transfer, via a managed data lake and based on the retrieved at least one parameter, the at least one data set from the producer data lake to a consumer data lake without duplication of the at least one data set in a storage layer; and
persist the at least one data set from the consumer data lake in the data warehouse,
wherein each of the producer account and the consumer account is linked via a cross-account role that enables access between a plurality of accounts, and
wherein the cross-account role is leveraged for the transferring of the at least one data set from the producer data lake to a consumer data lake without duplication of the at least one data set from the producer data lake.

16. The storage medium of claim 15, wherein the access includes automatic authentication based on the cross-account role.

17. The storage medium of claim 15, wherein each of the producer account and the consumer account corresponds to a resource container that delineates a plurality of computing resources in a cloud computing environment, the plurality of computing resources including at least one from among a storage bucket, a relational database, and a compute instance, and wherein each respective computing resource of the plurality of computing resources is delineated by a corresponding respective resource name that includes an account identifier.

18. The storage medium of claim 15, wherein the producer account includes a first set of computing resources in a first cloud computing environment and the consumer account includes a second set of computing resources in a second cloud computing environment that is different from the first cloud computing environment.

* * * * *